(12) United States Patent
Ulrich et al.

(10) Patent No.: US 9,764,828 B2
(45) Date of Patent: Sep. 19, 2017

(54) SPIN STABILIZED AERIAL AIRCRAFT

(71) Applicant: The Aerospace Corporation, El Segundo, CA (US)

(72) Inventors: Evan R. Ulrich, Manhattan Beach, CA (US); Stewart Sutton, Irvine, CA (US); Martin Panevsky, San Pedro, CA (US); Christopher B Dunbar, La Mirada, CA (US); Vishnu Jyothindran, Redondo Beach, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 14/822,847

(22) Filed: Aug. 10, 2015

(65) Prior Publication Data

US 2017/0043867 A1    Feb. 16, 2017

(51) Int. Cl.
  *B64C 27/16*  (2006.01)
  *G01W 1/08*  (2006.01)
  *B64C 39/02*  (2006.01)

(52) U.S. Cl.
  CPC ............ *B64C 27/16* (2013.01); *B64C 39/024* (2013.01); *G01W 1/08* (2013.01); *B64C 2201/024* (2013.01); *B64C 2201/125* (2013.01)

(58) Field of Classification Search
  CPC ..... B64C 27/16; B64C 39/024; B64C 39/028; B64C 11/14; B64C 2201/024; B64C 2201/125; G01W 1/08
  See application file for complete search history.

(56) References Cited

U.S. PATENT DOCUMENTS

| | | | | |
|---|---|---|---|---|
| 3,116,040 A | * | 12/1963 | Petrides | B64C 27/18 244/17.13 |
| 3,794,273 A | * | 2/1974 | Girard | B64C 27/026 244/17.19 |
| 5,359,888 A | * | 11/1994 | Hagen | G01P 1/10 73/178 R |
| 6,493,631 B1 | * | 12/2002 | Burns | G01C 17/30 701/472 |
| 6,601,795 B1 | * | 8/2003 | Chen | B64C 3/40 244/39 |
| 7,093,788 B2 | * | 8/2006 | Small | B64C 39/00 244/12.2 |
| 7,997,526 B2 | * | 8/2011 | Greenley | A63H 27/02 244/12.4 |
| 8,366,055 B2 | | 2/2013 | Ulrich et al. | |
| 8,991,751 B2 | * | 3/2015 | Page | B64C 29/02 244/39 |
| 9,085,354 B1 | * | 7/2015 | Peeters | B64C 29/02 |
| 2011/0062278 A1 | * | 3/2011 | Ulrich | B64C 39/024 244/48 |

(Continued)

FOREIGN PATENT DOCUMENTS

| | | | | |
|---|---|---|---|---|
| AT | CA 2811354 A1 | * | 3/2012 | ............ B64C 29/02 |
| WO | WO 9802350 A1 | * | 1/1998 | ............ B64C 29/02 |
| WO | WO 2008089432 A2 | * | 7/2008 | ........... B64C 39/024 |

*Primary Examiner* — Assres H Woldemaryam
(74) *Attorney, Agent, or Firm* — LeonardPatel PC

(57) ABSTRACT

A spin stabilized aircraft may include a plurality of wings that passively spin stabilize the aircraft, causing the apparatus to move in a direction opposite that of a wind source. The aircraft may also include two or more propulsive arms that actively stabilize the aircraft in absence of wind or a decrease in altitude.

16 Claims, 5 Drawing Sheets

(56) References Cited

U.S. PATENT DOCUMENTS

| | | | | |
|---|---|---|---|---|
| 2011/0233329 A1* | 9/2011 | McGeer | ............... | B64C 39/024 |
| | | | | 244/110 F |
| 2014/0091172 A1* | 4/2014 | Arlton | ................... | B64C 27/14 |
| | | | | 244/17.23 |
| 2014/0217229 A1* | 8/2014 | Chan | ..................... | B64C 29/02 |
| | | | | 244/6 |
| 2014/0312164 A1* | 10/2014 | Gibson | ................ | B64D 47/08 |
| | | | | 244/13 |
| 2015/0028155 A1* | 1/2015 | Reiter | ................... | B64C 27/16 |
| | | | | 244/39 |
| 2015/0232178 A1* | 8/2015 | Reiter | ............... | B64C 29/0033 |
| | | | | 244/7 A |
| 2015/0239578 A1* | 8/2015 | McGeer | .................. | B64F 1/02 |
| | | | | 244/110 R |
| 2015/0307191 A1* | 10/2015 | Samuel | ................ | B64C 33/02 |
| | | | | 244/22 |
| 2016/0001875 A1* | 1/2016 | Daler | ..................... | B64C 17/00 |
| | | | | 244/17.23 |
| 2016/0152321 A1* | 6/2016 | D'Andrea | .............. | B64C 27/20 |
| | | | | 701/3 |

* cited by examiner

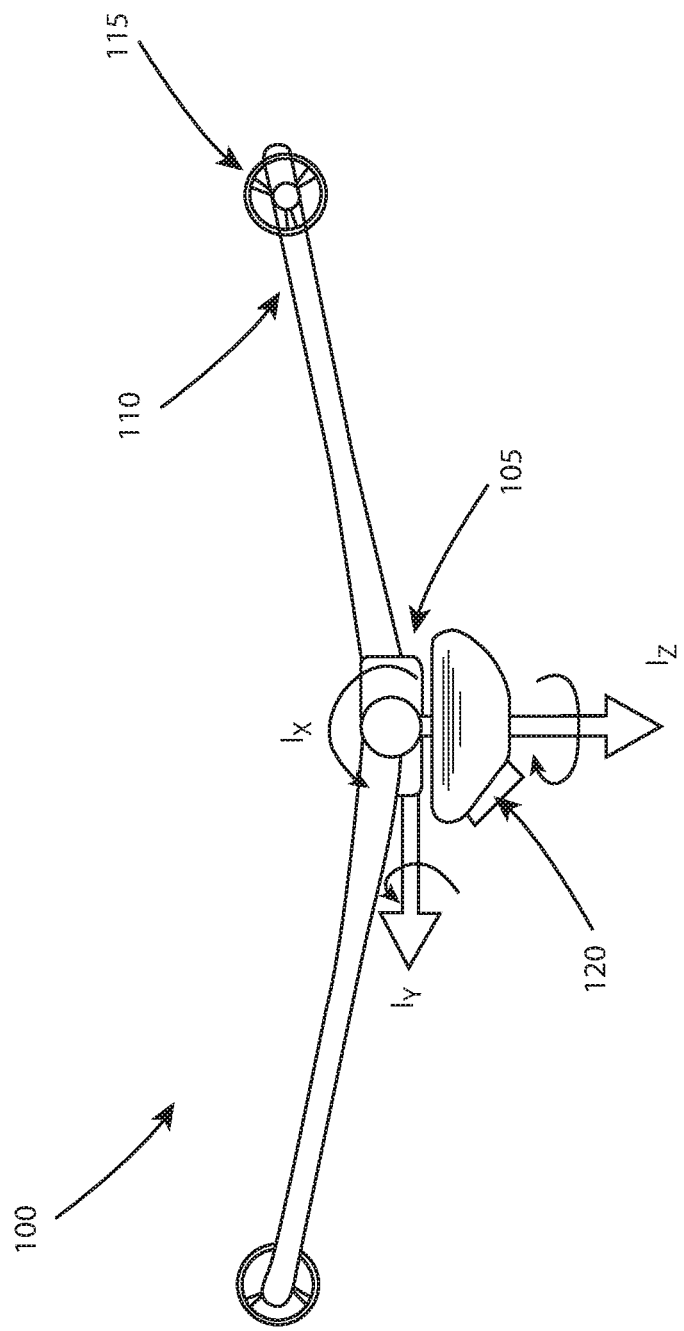

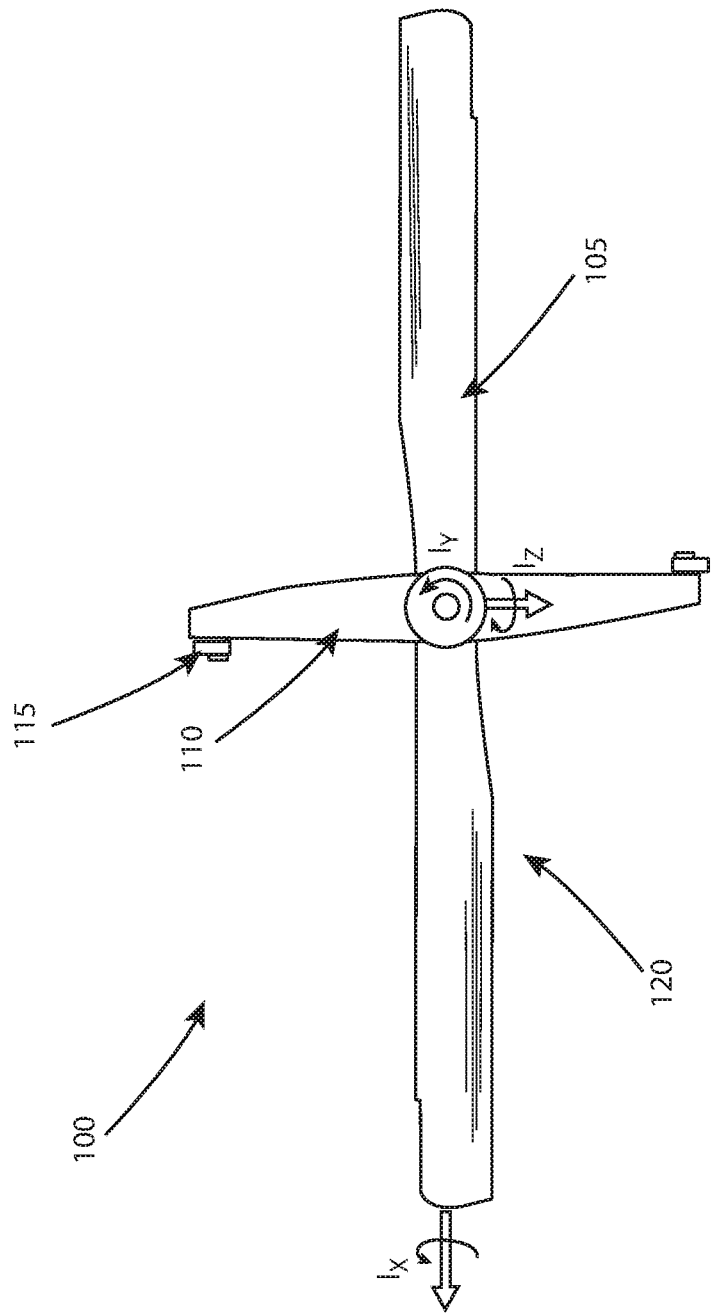

SPIN STABILIZED AERIAL AIRCRAFT

FIELD

The present invention relates to an aircraft and, more particularly, to a spin stabilized aerial aircraft.

BACKGROUND

In-situ meteorological data collection is generally limited to large manned aircraft, large unmanned aircraft, balloons, and parachute dropsondes. The large manned and unmanned aircrafts are powered and actively controlled, and generally stabilized during operation. However, these aircrafts are unable to safely navigate through high winds in a storm system, where untapped and highly relevant data for weather prediction resides.

In a high wind shear environment of a storm system, only uncontrolled and passively stable platforms, such as balloons and dropsondes, survive long enough to collect and transmit data in a specific area of interest before falling into the ocean or rising beyond the altitude where measurements are needed. However, collection of this data is spatially and/or temporally sparse, and the collection is entirely dependent on the rate at which the sensor on the platform climbs and/or falls. Furthermore, these platforms are generally used once, and therefore, increase the overall cost of using these platforms.

Thus, an alternative approach may be beneficial.

SUMMARY

Certain embodiments of the present invention may provide solutions to the problems and needs in the art that have not yet been fully identified, appreciated, or solved by current in-situ meteorological data collection aircrafts. For example, in some embodiments, an aerial sensor platform (the "aircraft") is spin stabilized and possibly powered. The aircraft may include two or more propulsive arms and two or more lifting wings, each lifting wing is placed in opposition to its twin. The aircraft may move in a direction opposite of a wind shear source. The aircraft may include a sensor to track the aircraft position and velocity. This way, when an incoming gust alters the aircraft trajectory, the incoming gust can be correlated to the wind shear velocity.

In one embodiment, an apparatus may include a plurality of wings configured to spin stabilize the apparatus, causing the apparatus to move in a direction opposite of a wind source. The apparatus also includes two or more propulsive arms configured to actively stabilize the apparatus in the absence of a wind or a decrease in altitude.

In another embodiment, an apparatus may include a plurality of wings configured to cause the apparatus to (autorotate) spin in a windy environment and maintain altitude. The apparatus may also include a plurality of propulsive arms perpendicular to the plurality of wings and configured to cause the apparatus to spin in a calm environment.

In yet another embodiment, an apparatus includes at least two wings attached to a body of the apparatus. The apparatus also includes at least two propulsive arm extending out from the body of the apparatus in two directions, the at least two propulsive arm is perpendicular to the at least two wings. The at least two wings are configured to spin stabilize the apparatus without power, and the at least two propulsive arm are configured to actively stabilize the apparatus in absence of wind, a decrease in altitude, or both.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIGS. 1A-D illustrates different views of a spin stabilized aircraft, according to an embodiment of the present invention.

DETAILED DESCRIPTION OF THE EMBODIMENTS

Figure 1A:
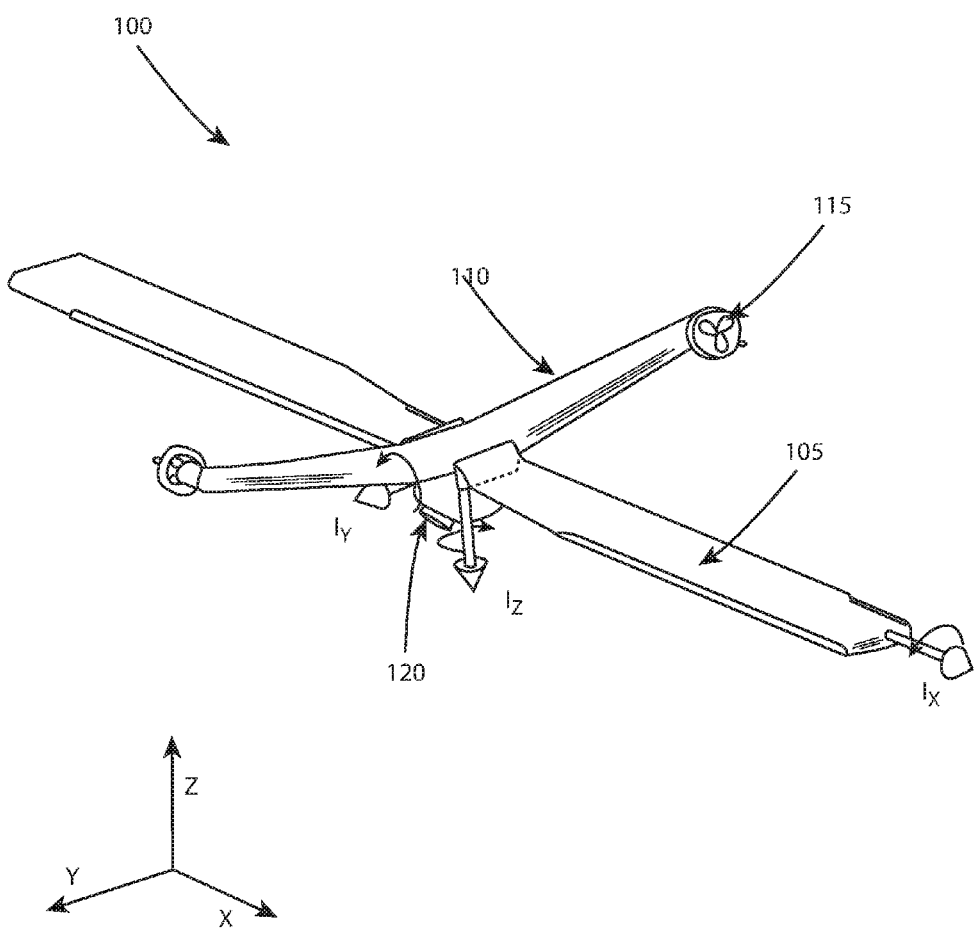
Figure 1C:
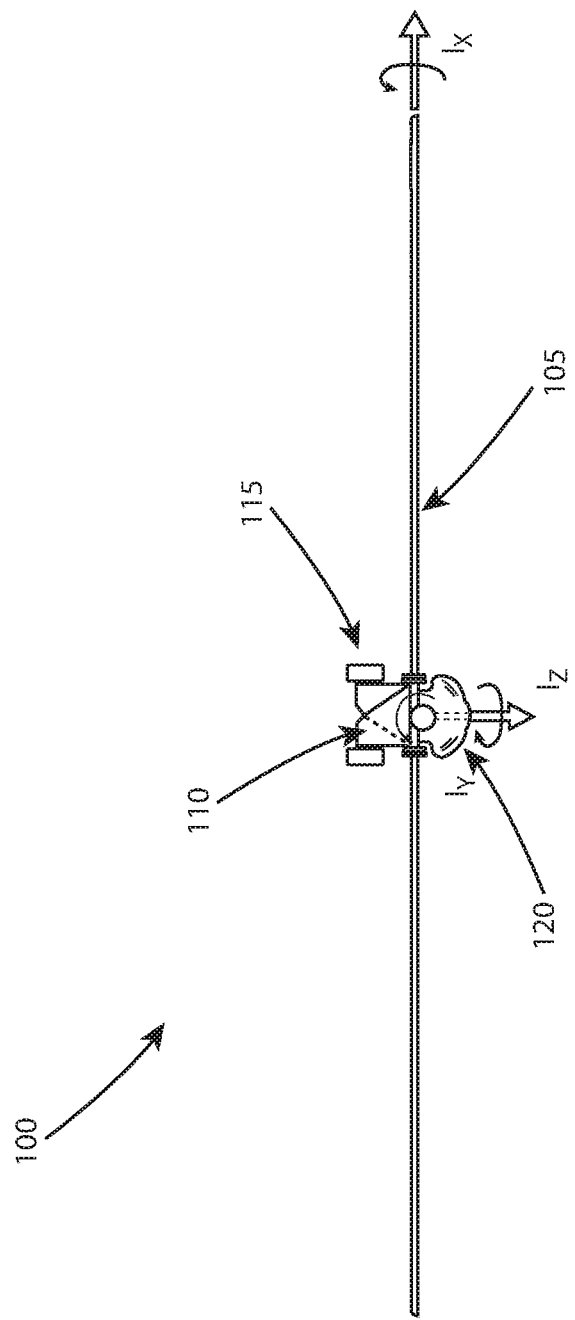

As discussed above, current in-situ meteorological data collection aircrafts are limited, the data collected is sparse in turbulent regions (generally the area of greatest interest), and entirely dependent on dwell time of the sensor. A resolution to this issue is a spin stabilized auto-rotating sensor platform. The aircraft includes at least two lifting surfaces (or wings) and two or more propulsive arms, allowing the aircraft to hover or climb in altitude. The aircraft may also include a sensor that collects wind data at altitudes with long dwell times and with controlled positioning.

FIGS. 1A-D different views of a spin stabilized aircraft (or aerial wind shear sensor platform) 100, according to an embodiment of the present invention. In this embodiment, spin stabilized aircraft (or aircraft) 100 may be spin or passively stabilized and, optionally, powered or actively stabilized. For example, in a windy environment, the wind causes aircraft 100 to spin, passively stabilizing aircraft 100, i.e., stabilize without using power. Also, during descent, aircraft 100 may be spinning, maintaining passive stabilization of aircraft 100.

In a calm environment or a subsequent decrease in altitude, aircraft 100 may switch to active stabilization to maintain flight or altitude. For instance, during active stabilization, engines 115 are powered to maintain the rotation of aircraft 100, thereby maintaining the stability of aircraft 100. For example, engines 115 are powered through an on-board electric power system that incorporates adaptive control that is relayed by a manned flyer, or alternatively, through an autonomous control system embedded on the vehicle. Aircraft 100 may include a control system that can be operated over various modes of operation, which govern the duty cycle (time off/time on) of aircraft 100 propulsion system. This allows aircraft 100 to spatially orient sensor 120 in three dimensions. This controlled aircraft positioning would be particularly advantageous to meteorologists in terms of spatial weather modeling.

In other words, the passive stabilization feature in combination with the active stabilization feature provides aircraft 100 with a longer duration of flight time, as well as enabling sustained altitudes.

Aircraft 100 in some embodiments is a tightly coupled extension of the sensing system, i.e., the position and flight dynamics of aircraft 100 may be used to more accurately measure wind shear. For example, as aircraft 100 is hovering or decreasing in altitude, the vertical force on aircraft 100 (if it is passively stable in its equilibrium) is proportional to the wind shear acting on aircraft 100. By tracking and correlating both the location and rotation rate of aircraft 100, the wind shear can be more accurately measured than a sensor measurement on traditional copter and fixed wing designs.

Aircraft 100 may have mass distribution such that the primary (or principal) inertial axis I is coincident with the primary axis of rotation. The constraint on inertial distribution may be such that $I_X > I_Z$ and $I_Y > I_Z$ or $I_Z > I_X$ and $I_Z > I_Y$ with primary spin about the $I_Z$ axis, where $I_X$ is the principal inertial x-axis, $I_Y$ is the principal inertial y-axis, and $I_Z$ the principal inertial z-axis.

In certain embodiments, aircraft 100 may actively modify the wing pitch, e.g., through active control (gives directional control) or auto-rotation control. In other embodiments, the wing pitch may be at a fixed angle such that aircraft 100 is always spinning or rotating. In some embodiment, a servo may actively control the wing pitch. However, it should be appreciated that any mechanism or technique that changes an angle of the wing pitch conducive to autorotation may be used.

Propulsive arms 110 may include engines 115 in some embodiments that provide active stabilization. Engines 115 may be placed in opposite ends to each other, and face in the opposite direction to cause aircraft 100 to spin when engines 115 are powered.

In some embodiments, wings 105 and propulsive arms 110 may be bent at an angle to create the spin on aircraft 100. In some embodiments, wings 105 and propulsive arms 110 may be bent at the same angle, while in other embodiments, wings 105 and propulsive arms 110 may be bent at different angles.

Sensor 120 in one or more embodiments may be fixed to aircraft 100, such that sensor 120 does not rotate independent of aircraft 100. Because sensor 120 is affixed to aircraft 100, sensor 120 may be spun as aircraft 100 spins. This allows sensor 120 to be spun in a 360 degree manner, tracking the position and velocity of aircraft 100.

In some embodiments, however, sensor 120 may be affixed to aircraft 100 such that sensor 120 spins relative to aircraft 100, either in opposition or in addition to, the rotation rate of aircraft 100. By spinning sensor 120 and aircraft 100 relative to each other, sensor 120 may achieve a fixed inertial rate. This decoupling of the rotational lift platform from the sensor platform can provide important isolation where precision pointing and tracking of the sensor platform is required as part of the mission requirements. Such flexibility enables a multi-purpose platform where spun sensors or inertially pointed missions can be flown on a common platform.

In some embodiments, wings 105 may be articulated at the intersection with the fuselage through active control. Deflection of wings 105 by servo or wing flap may generate control forces. These forces, for example, may control the direction of flight in the vertical and horizontal direction through collective and cyclic actuation. These forces may also stabilize or destabilize aircraft 100 in some embodiments.

In certain embodiments, sensor 120 may include a rotating hot wire anemometer sensor or micro-cup mechanical sensor for wind speed measurement. This sensor may work in conjunction with an active control system (ACS) and an inertial measurement unit (IMU) to accurately zero-out wind speed resulting from the rotational rate of aircraft 100. The remaining measurement of wind speed after subtracting wind correlated with wing rotation can be attributed to the velocity of the wind moving past the aircraft's relatively stationary position. Sensor 120 that is moving across an entire volume of aircraft position (instead of just a fixed point along a non-rotational aircraft orientation) has the advantage of a broader sample range within the dwell environment of aircraft 100. This can offer a more accurate calculation of wind speed than an aircraft that is stationary with a single sensor fixed within the aircraft's stationary geometry.

In a further embodiment, sensor 120 may include an accelerometer to measure wind shear on aircraft 100, also known as the auto-rotating sensor platform. For example, a small scale, lightweight, ultralow power, 3-axis MEMS accelerometer device (not shown) in combination with aircraft 100 provides a fusion between sensor 120 and aircraft 100, where aircraft 100 is fundamental in the design of sensor measurement. In certain embodiments, with a paired configuration of two accelerometers, small changes in the rotational rate of aircraft 100 in addition to changes the displacement in aircraft 100 due to environmental forces can be determined. These measurements may be filtered and isolated from aircraft-controlled forces delivered through the propulsion system of aircraft 100 to determine a collective force placed on aircraft 100 due to winds experienced within the operating environment of aircraft 100.

Aircraft 100 may be stable in high-wind or wind-gust conditions. Wind gusts, including wind shear events, may cause aircraft 100 to spin faster as part of the auto-stabilizing design. When the rotation-rate of aircraft 100 increases, a corresponding displacement in aircraft 100 location due to extra lift generated by the rotation rate is realized. This change in rotation rate and change in aircraft 100 location are both measured by the second accelerometer sensor in the pair of accelerometers. Vertical wind gusts (and shear) that originates above aircraft 100 with a downward force may have a different effect on aircraft 100 than wind gust (shear) that originate below aircraft 100 with an upward force vector. Both of these unique forces can be extrapolated from the dual accelerometer pair.

In situ measurement of wind shear is difficult with existing environmental sensing platforms. For example, balloons have slow ascent rates to establish a vertical location for measurements, and wind will push the balloons out of the area of interest, i.e., the area where measurements need to be recorded. Fixed wing aircrafts are inherently unstable within a wind shear environment, and rotocopter design aircrafts are also inherently unstable within turbulent wind conditions. Dropsondes are expendable weather reconnaissance devices that move from higher vertical positions to lower vertical positions, and sample the environment while moving quickly through the area of interest. Aircraft 100, however, dwells in the measurement target area of interest and "surfs" the wind in the area of interest as aircraft 100 dwells in its specified location, while converting gust measurements into telemetered wind shear (speed and direction) measurements in real time.

Accuracy in measurement of temperature and humidity can be improved by expanding the sample size within a defined geospatial region of interest. In some embodiments, sensor 120 may be placed near the outer region of aircraft 100. This way, through the process of rotation, sensor 120 "scans" a larger air mass and gathers more samples per unit over time within a fixed geospatial region. The coupling of both temperature and humidity as a combined sensor measurement may be driven by a common integration of these measurements on commercial sensor assemblies, and the desire to integrate these as in situ measurements where surrounding environmental conditions (e.g., high wind and/or high temperature) preclude multiple readings in sequence from a location within a meter cubed geospatial dimension. In situ measurement of temperature and humidity has utility in environmental applications, such as remote assessment of soil and crop quality, and for fire weather forecasting functions.

Figure 2:
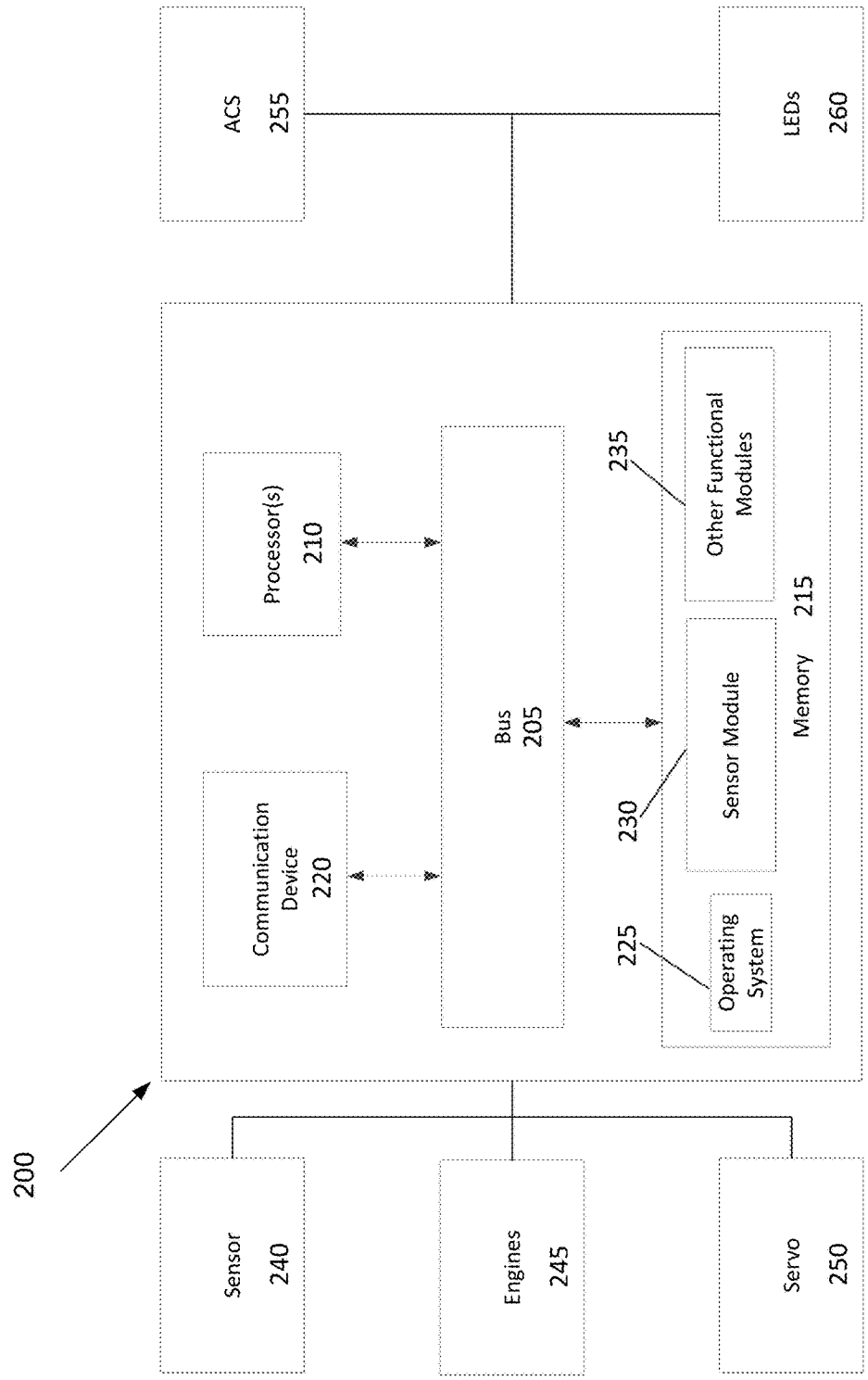
FIG. 2 is a block diagram illustrating a computing system, according to an embodiment of the present invention.

FIG. 2 illustrates a block diagram of a computing system 200 for the aircraft, according to one embodiment of the present invention. Computing system 200 may include a bus 205 or other communication mechanism configured to communicate information, and at least one processor 210, coupled to bus 205, configured to process information. At least one processor 210 can be any type of general or specific purpose processor. Computing system 200 may also include memory 220 configured to store information and instructions to be executed by at least one processor 210. Memory 220 can be comprised of any combination of random access memory ("RAM"), read only memory ("ROM"), static storage such as a magnetic or optical disk, or any other type of computer readable medium. Computing system 200 may also include a communication device 215, such as a network interface card, configured to provide access to a network, and communicate weather data, such as wind speed and velocity of the aircraft, to a ground center or home base.

The computer readable medium may be any available media that can be accessed by at least one processor 210. The computer readable medium may include both volatile and nonvolatile medium, removable and non-removable media, and communication media. The communication media may include computer readable instructions, data structures, program modules, or other data and may include any information delivery media.

According to one embodiment, memory 220 may store software modules that may provide functionality when executed by at least one processor 210. The modules can include an operating system 225 to operate the aircraft and a sensor module 230 for tracking the velocity of the aircraft. For example, in some embodiments, sensor module 230 may activate or control sensor 240 in order to collect weather data. Sensor 240 may include, or be connected to, accelerometer(s), IMUs, etc.

Memory 220 may also include other functional modules 235, such as an active and passive control sensor configured to activate the engines 245 to establish active control of the aircraft and deactivate the engine to once the aircraft is spin stabilized. Operating system 225 may provide operating system functionality for computing system 200. Because computing system 200 may be part of a larger system, computing system 200 may include one or more additional functional modules 235 to include the additional functionality.

In certain embodiments, computing system 200 may be connected to, for example, a servo 250 to control the wing pitch of the aircraft, and may also be connected to ACS 255. ACS 255 for this embodiment may enable pre-programmed flight between two or more navigational waypoints that are composed within the onboard flight system. In one embodiment, control is attained through pilot operator interaction with aircraft 100, and in another embodiment that control may be enacted by fusion of vehicle and environmental sensors in conjunction with onboard algorithms in such a way that the aircraft may operate autonomously and with minimal or no human interaction. Computing system 200 may also be connected to one or more light emitting diodes 260, and may turn on and/or off light emitting diodes 260.

It should be appreciated that the aircraft's computing system 200 may be controlled remotely from a ground station. This way, a user at the ground station may operate the aircraft. In other embodiments, the aircraft's computing system 200 may be preprogrammed with a set of instructions. This set of instructions may control how the aircraft is operated during flight.

Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

In some embodiments, an aircraft may include two or more wings, two or more propulsive arms, engines, and a sensor package. In some embodiments, each wing is placed in opposition to its twin. Similarly, each propulsive arm may also be placed in opposition to its twin.

As the aircraft moves in a direction opposite of the source (not shown) of the wind shear, sensor package may track aircraft position and velocity. The sensor package may also correlate any incoming gust that alters aircraft's trajectory to the velocity of the wind shear.

In order to launch the aircraft from the ground, the aircraft may be activated or powered. Since the engines face in opposite directions separated by some distance, a net torque is applied to the vehicle causing it to spin, which generates lift on the wings leading to flight in a vertical direction. Once the aircraft reaches an altitude of interest the wings allow the aircraft to hover, descend, or move in a transverse direction. Additionally, the engines may be powered off and the wings may be reoriented to induce autorotation.

In some embodiments, the aircraft may be launched from a second vehicle, such as a cargo plane, and subsequently dropped over the area of interest. In this example, the engines are not powered, since the wind force over the area of interest causes the aircraft to spin via the wings. If the aircraft loses altitude or the wind speed is decreased, the engines may turn on to create actively stabilize the aircraft.

The aircraft described herein may be used for various applications. For example, the aircraft may be used to determine the wind shear on spacecraft day of the launch, or may be used to gather data at low altitudes of between 200 feet to 5000 feet in a hurricane or tropical storm. The aircraft may also be used to sense winds, and in particular, wind shear in a wild fire scenario. This may facilitate more accurate forecasting of fire weather and deployment of water and/or chemical drops in hot zones. For example, the spin-stabilized aircraft may accurately measure wind shear, temperature, and humidity drop within 100 yards of the fire line, improving planning and safety for a fire crew.

The aircraft in some embodiments may also be used to detect the magnitude and direction of the wind shear. For example, a pilot generally requires 10 to 40 seconds of warning to avoid wind shear. The spin-stabilized aircraft may accurately measure the wind shear within 1000 yards of the flight path to greatly improve the safety of passengers in a commercial aircraft.

The aircraft may also be used for tornado super-cell detection and an early warning system. For example, the aircraft may accurately measure wind shear and map the thermal and electromagnetic signature of the tornado. This will enable more warning time to people who may be in the path of the storm, increasing the likelihood of survival.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
   a plurality of wings configured to spin stabilize the apparatus, causing the apparatus to move in a direction of wind; and
   a propulsive arm configured to actively stabilize the apparatus in absence of wind or a decrease in altitude; and
   two or more engines opposed to each other on opposite ends of the propulsive arm to create a force causing the apparatus to spin, wherein the force allows the plurality of wings to create a lift for the apparatus, and
   the plurality of wings attached to a center cross section of the propulsive arm and to a center of rotation for the apparatus, such that each of the plurality of wings move relative to the plurality of motors, thereby decoupling the plurality of wings from the propulsive arm, and
   a sensor configured to track a location and a rotation rate of the apparatus to measure wind shear, wherein the sensor spins in a direction relative to the apparatus to achieve a fixed inertial rate and the sensor spins in opposition or in addition to a rotation rate of the apparatus.

2. The apparatus of claim 1, wherein the spin stabilization of the apparatus comprises a specific mass distribution such that the primary inertial axis is coincident with the primary axis of rotation.

3. The apparatus of claim 2, wherein the specific mass distribution comprises a constraint on inertial distribution such that $I_Z > I_X$ and $I_Z > I_Y$ with a primary spin about an $I_Z$ axis, wherein
   $I_X$ is a principal inertial x-axis, $I_Y$ is a principal inertial y-axis, and $I_Z$ a principal inertial z-axis.

4. The apparatus of claim 2, wherein
   the two or more engines are further configured to control a rotation rate of the apparatus.

5. The apparatus of claim 4, wherein the force generated by the two or more engines applies a torque to the apparatus causing apparatus to spin stabilize.

6. The apparatus of claim 1, wherein the plurality of wings cause the apparatus to spin stabilize when the wind impinges upon the plurality of wings.

7. An apparatus, comprising:
a plurality of wings configured to cause the apparatus to spin in a windy environment and maintain altitude;
a propulsive arm extending through rotation axis Iz configured to cause the apparatus to spin in a calm environment; and
two or more engines opposed to each other on opposite ends of the plurality of propulsive arms to create a force causing the apparatus to spin, wherein
the force allows the plurality of wings to create a lift of the apparatus, and the plurality of wings being perpendicular to the propulsive arm are attached to a center cross section of the propulsive arm and to a center of rotation for the apparatus, such that each of the plurality of wings move relative to the two or more motors, thereby decoupling the plurality of wings from the propulsive arm, and
a sensor configured to track a location and a rotation rate of the apparatus to measure wind shear, wherein the sensor spins in a direction relative to the apparatus to achieve a fixed inertial rate and the sensor spins in opposition or in addition to a rotation rate of the apparatus.

8. The apparatus of claim 7, wherein the spin stabilization of the apparatus comprises a specific mass distribution such that the primary inertial axis is coincident with the primary axis of rotation.

9. The apparatus of claim 8, wherein the specific mass distribution comprises a constraint on inertial distribution such that $I_Z > I_X$ and $I_Z > I_Y$ with a primary spin about an $I_Z$ axis, wherein
$I_X$ is a principal inertial x-axis, $I_Y$ is a principal inertial y-axis, and $I_Z$ a principal inertial z-axis.

10. The apparatus of claim 8, wherein
the two or more engines are further configured to control a rotation rate of the apparatus.

11. The apparatus of claim 10, wherein the force generated by the two or more engines applies a torque to the apparatus causing apparatus to spin stabilize.

12. The apparatus of claim 7, wherein the plurality of wings cause the apparatus to spin stabilize when the wind impinges upon the plurality of wings.

13. The apparatus of claim 7, further comprising:
a sensor configured to track a location and a rotation rate of the apparatus to measure wind shear.

14. The apparatus of claim 13, wherein the sensor spins in a direction relative to the apparatus to achieve a fixed inertial rate.

15. The apparatus of claim 14, wherein the sensor spins in opposition or in addition to a rotation rate of the apparatus.

16. An apparatus, comprising:
at least two wings attached to a body of the apparatus;
a propulsive arm extending through rotation axis Iz; and
two or more engines opposed to each other on opposite ends of the propulsive arm to create a force causing the apparatus to spin, the force causing the wings to create a lift for the apparatus, wherein
the at least two wings are configured to spin stabilize the apparatus without power,
the at least two propulsive arm are configured to actively stabilize the apparatus in absence of wind, a decrease in altitude, or both, and
the plurality of wings are attached to the center cross section of the propulsive arm and to a center of rotation for the apparatus, such that each of the plurality of wings move relative to the plurality of motors, thereby decoupling the plurality of wings from the propulsive arm, and
a sensor configured to track a location and a rotation rate of the apparatus to measure wind shear, wherein the sensor spins in a direction relative to the apparatus to achieve a fixed inertial rate and the sensor spins in opposition or in addition to a rotation rate of the apparatus.

* * * * *